United States Patent [19]

Koshizawa et al.

[11] Patent Number: 4,926,994

[45] Date of Patent: May 22, 1990

[54] AUTOMATIC CLUTCH CONTROL APPARATUS

[75] Inventors: Toshifumi Koshizawa, Kawasaki; Kiyomi Ohkawa, Fujisawa; Teruhiko Horiuchi, Yokohama, all of Japan

[73] Assignee: Isuzu Motors Limited, Tokyo, Japan

[21] Appl. No.: 406,809

[22] Filed: Sep. 12, 1989

Related U.S. Application Data

[63] Continuation of Ser. No. 95,649, Sep. 14, 1987, abandoned.

[30] Foreign Application Priority Data

Sep. 13, 1986 [JP] Japan .................. 61-216426

[51] Int. Cl.⁵ .................. F16D 25/14; B60K 41/28
[52] U.S. Cl. .................. 192/110 R; 192/0.052; 192/85 C
[58] Field of Search .............. 192/0.032, 0.052, 0.076, 192/109 F, 110 R, 85 C

[56] References Cited

U.S. PATENT DOCUMENTS

| | | | |
|---|---|---|---|
| 2,539,649 | 1/1951 | Winther | 192/0.076 |
| 2,922,503 | 1/1960 | Maurice et al. | 192/0.052 |
| 4,331,226 | 5/1982 | Heidemeyer et al. | 192/0.076 |
| 4,497,397 | 2/1985 | Windsor et al. | 192/0.076 |
| 4,529,072 | 7/1985 | Oguma et al. | 192/0.052 |
| 4,558,772 | 12/1985 | Grimes et al. | 192/0.076 |
| 4,618,043 | 10/1986 | Hattori et al. | 192/0.052 |
| 4,629,045 | 12/1986 | Kasai et al. | 192/0.052 |
| 4,632,231 | 12/1986 | Hattori et al. | 192/0.076 |
| 4,732,246 | 3/1988 | Tateno et al. | 192/0.076 X |

FOREIGN PATENT DOCUMENTS 2088007  6/1982  United Kingdom ............. 192/0.032
2170571A 8/1986  United Kingdom .

OTHER PUBLICATIONS

European Search Report of Feb. 24, 1988.

Primary Examiner—Rodney H. Bonck
Attorney, Agent, or Firm—Staas & Halsey

[57] ABSTRACT

Basic clutch control data is stored in an electronic control unit which controls a clutch actuator. An automatic clutch control apparatus has a setting unit for setting an amount of fine adjustment of an amount or speed of engagement of a clutch. The basic clutch control data is corrected by an amount of fine adjustment set by the setting unit for controlling the operation of the clutch.

7 Claims, 2 Drawing Sheets

AUTOMATIC CLUTCH CONTROL APPARATUS

This is a continuation of copending application(s) Ser. No. 095,649 filed on Sept. 14, 1987 and now abandoned.

BACKGROUND OF THE INVENTION

1. Field of the Invention

The present invention relates to an apparatus for controlling an automatic clutch mounted on a vehicle such as an automobile.

2. Description of the Related Art

Automotive automatic transmissions employing torque converters are well known in the art. Since, however, automatic transmissions of this type are complex in mechanism and heavy and cause a large power loss due to the torque converter, there has recently been developed an electronically controlled automatic transmission which employs a conventional manual transmission and a conventional friction clutch and an electronic control unit for controlling their operation that has been manually performed by a human being.

When starting and changing speeds of an automobile incorporating such an electronically controlled automatic transmission, the clutch is first disengaged, gears are shifted, and then the clutch is engaged, in the same manner as a manual transmission is operated. The electronic control unit has a memory storing clutch operation data (representing the amount of engagement of the clutch and the speed of engagement of the clutch) for each gear position. When the automobile is started or the gears are changed, necessary data is read out of the memory, and the clutch is automatically controlled on the basis of the read-out data.

Where preset conditions (such as clutch conditions and engine conditions) are varied with time or due to temporary trouble, however, the clutch may be excessively slipped or engaged too quickly even if it is controlled on the basis of the stored data. When this happens, the clutch is worn soon or the driver feels uneasy about the clutch operation. These problems may be caused by a new automobile since the clutch characteristics slightly vary from automobile to automobile due to manufacturing errors of clutches and errors that may be produced when installing clutches on automobiles.

Some drivers connect a clutch relatively slowly for better riding comfort, whereas other drivers connect a clutch rather quickly to get the automobile started or shift gears rapidly. If the clutch is to be controlled on the basis of stored data, it is impossible to control the clutch in a way to meet individual driver's tastes.

One clutch control apparatus devised to solve the above problems is disclosed in Japanese Laid-Open Patent Publication No. 60-12343 filed by the present application. The disclosed clutch control apparatus has a plurality of memories storing basic clutch control data items, respectively. By operating a changeover switch, desired clutch control data which suits the driver's taste can be read out of one of the memories. However, since the available clutch control data items must be stored in the memories in an electronic control unit, the entire capacity of the memories is increased. The prior-art clutch control apparatus fails to solve the problems of time-dependent changes of the clutch and manufacturing and assembling errors of the clutch.

SUMMARY OF THE INVENTION

It is an object of the present invention to provide an automatic clutch control apparatus for controlling a vehicle clutch in a manner to meet the driver's taste without requiring an increase in the capacity of a memory in an electronic control unit.

Another object of the present invention is to provide an automatic clutch control apparatus capable of easily making adjustments in view of time-dependent changes of the clutch and manufacturing and assembling errors of the clutch, so that the clutch can be operated appropriately.

According to the present invention, there is provided an automatic clutch control apparatus for controlling a clutch actuator for engaging and disengaging a clutch on a vehicle with an electronic control unit, comprising means for determining a basic amount of engagement of the clutch based on operating conditions of the vehicle, means for setting an amount of fine adjustment of the amount of engagement of the clutch, and means for determining an amount of engagement of the clutch based on the basic amount of engagement and the amount of fine adjustment.

Further according to the present invention, there is provided an automatic clutch control apparatus for controlling a clutch actuator for engaging and disengaging a clutch on a vehicle with an electronic control unit, comprising means for determining a basic speed of operation of the clutch actuator based on operating conditions of the vehicle, means for setting an amount of fine adjustment of the speed of operation of the clutch actuator, and means for determining an amount of operation of the clutch based on the basic speed of operation and the amount of fine adjustment.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
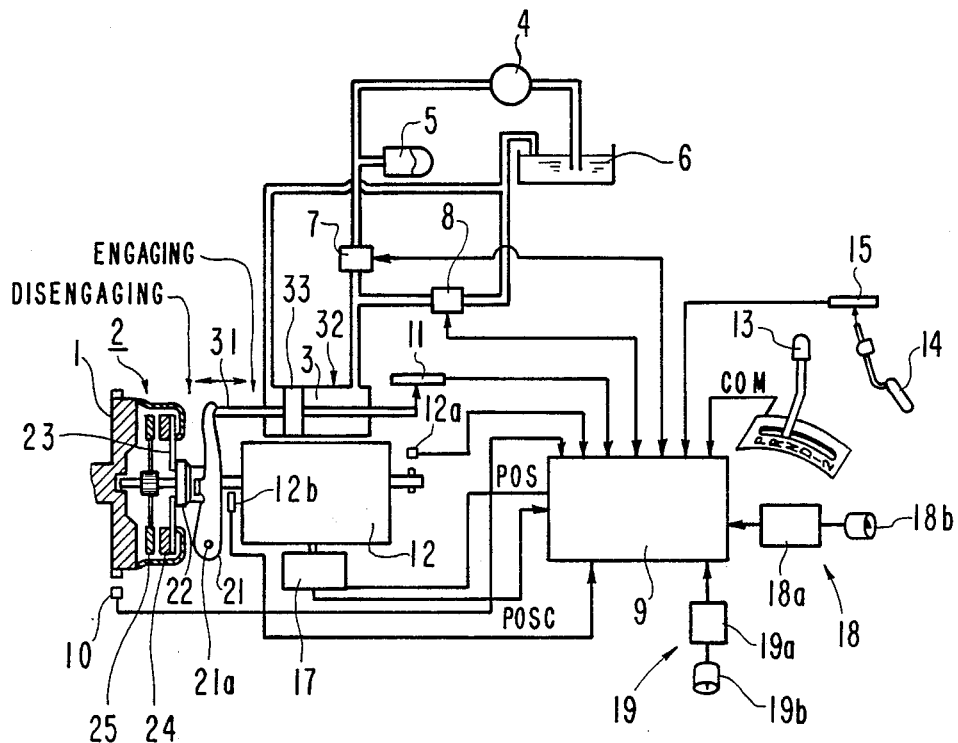
FIG. 1 is a schematic view, partly in block form, of an automatic clutch control apparatus according to the present invention.

As shown in FIG. 1, a flywheel 1 is mounted on the rotatable shaft of an engine (not shown) and combined with a friction clutch 2 which is identical in structure to the clutch of a conventional manual transmission. The clutch 2 has a diaphragm spring 23 for normally urging a pressure plate 24 to the left to displace a driven plate 25 into engagement with the flywheel 1. The diaphragm spring 23 also urges a release bearing 22 to the right for turning a clutch control lever 21 clockwise about a pivot shaft 21a. A hydraulically operated clutch actuator 3 has a cylinder 32 housing therein a reciprocally movable piston 33 connected to a piston rod 31. When the clutch actuator 3 is operated to move the piston rod 31 in a direction to turn the clutch control lever 21 about the pivot shaft 21a in a "disengaging" direction, the clutch 2 is disengaged. The cylinder 32 is connected to a pump 4, an accumulator 5, an oil tank 6, a solenoid-operated supply valve 7, and a solenoid-operated discharge valve 8.

An electronic control unit 9 comprising a microcomputer composed of a central processing unit for performing various arithmetic operations, input and output ports for transmitting and receiving data, a random-access memory (RAM) for temporarily storing data and results of arithmetic operations, a read-only memory (ROM) storing a control program, and a clutch data ROM storing clutch control data (an amount and a speed of engagement of the clutch) based on which the piston 33 of the clutch actuator 3 will be controlled. The electronic control unit 9 is supplied with an input signal from an engine RPM sensor 10 disposed near the outer circumferential surface of the flywheel 1, and an input signal from a piston position sensor 11 for detecting the position of the piston 33 of the clutch actuator 3, the piston position sensor 11 comprising a potentiometer, for example. A gear transmission 12 comprising a conventional manual synchromesh transmission is coupled to the clutch 2. The electronic control unit 9 is also supplied with an input signal from a vehicle speed sensor 12a which determines a vehicle speed from the rotational speed of the output shaft of the transmission 12, and an input signal from an input shaft speed sensor 12b which detects the rotational speed of the input shaft of the transmission 12. A selector lever 13 which is operated by the vehicle driver to apply a gear shifting command has various gear ranges including, for example, range "1" (fixed to a 1st gear position: the gear range for starting the vehicle on a steep slope), range "2" (fixed to a 2nd gear position: the gear range for starting the vehicle on a snow-covered road and getting the vehicle out of a muddy road), range "D3" (variable between 1st and 3rd gear positions: the gear range for driving the vehicle on an uphill road), range "D5" (variable between 1st and 5th gear positions: the gear range for driving the vehicle in normal conditions), range "R" (fixed to a reverse gear position), and range "N" (neutral gear position). A signal COM indicative of the gear range selected by the selector lever 13 is applied to the electronic control unit 9. An accelerator pedal 14 is associated with an accelerator pedal position sensor 15 such as a potentiometer which applies a pedal position signal to the electronic control unit 9. A transmission actuator 17 is responsive to a control signal POSC from the electronic control unit 9 based on the signal COM from the selector lever 13 for shifting the gears of the transmission 12 to a gear range optimum for the running conditions of the vehicle. The gear range presently selected of the transmission 12 is represented by a signal POS which is applied to the electronic control unit 9. The transmission actuator 17 is hydraulically operated by a hydraulic control circuit, which is omitted from illustration for the sake of brevity. The transmission actuator 17 and the clutch actuator 3 may however be pneumatically operated.

Figure 2A:
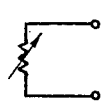
FIGS. 2(a) and 2(b) are schematic wiring diagrams of a potentiometer and a selector switch, respectively, either of which is used as part of the means for setting an amount of fine adjustment.
Figure 2B:
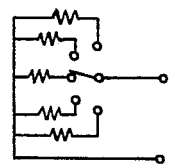

According to the present invention, there is provided a means 18 for setting an amount of fine adjustment, comprising a fine-adjustment position detector 18a and a knob 18b for manually operating the fine-adjustment position detector 18a. The fine-adjustment position detector 18a may comprise either a potentiometer, the basic circuitry of which is shown in FIG. 2(a) or a multiple-contact selector switch as shown in FIG. 2(b). The setting means 18 is located in a suitable position around the driver's seat and can be operated by the driver to make fine adjustments either when the manner in which the clutch 2 is connected or engaged has varied with time or to meet a clutch engaging mode desired by the driver. The setting means 18 is effective to make fine adjustments of the basic amount of engagement of the clutch 2 among the basic clutch control data items (amount and speed of engagement of the clutch 2) which are determined by various factors such as the amount of depression of the accelerator pedal 14, the engine rotational speed, and the rotational speed of the input shaft of the transmission 12. More specifically, the amount of fine adjustment as established by the setting means 18 is added to or subtracted from the basic amount of engagement of the clutch 2 to provide a new amount of clutch engagement based on which the clutch engagement is controlled. Setting positions that can be assumed by the setting means 18 and amounts of fine adjustment corresponding to such setting positions are stored in advance in the memory (ROM) of the electronic control unit 9. Any set amount of fine adjustment is stored in the memory (RAM). Until a new amount of fine adjustment is set, the previous amount of fine adjustment that has been stored is employed.

Figure 3:
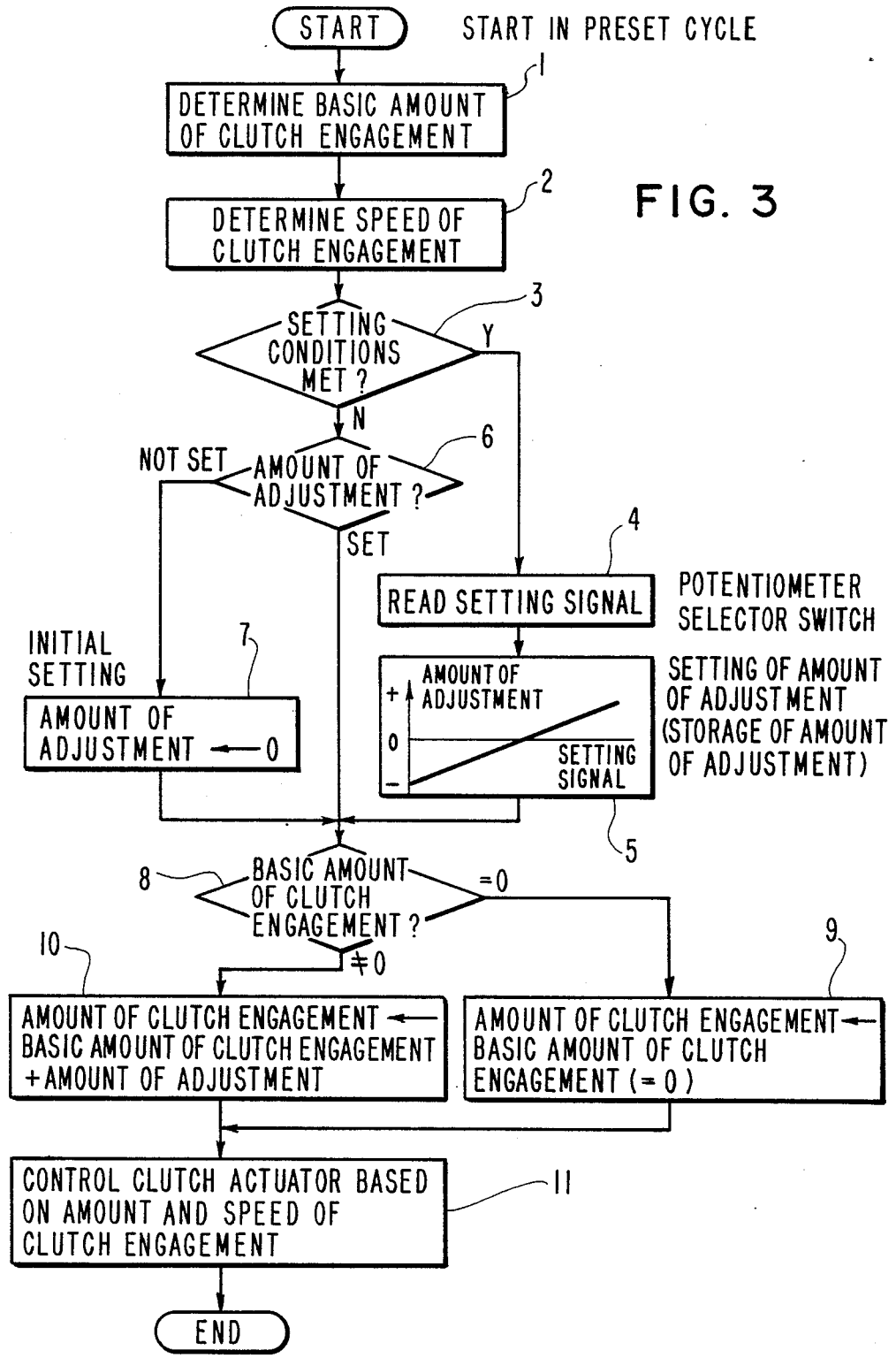
FIG. 3 is a flowchart of a control sequence of a clutch.

Operation of the automatic clutch control apparatus thus constructed will be described with reference to FIG. 3.

A basic amount of engagement of clutch 2 is determined in a step 1 on the basis of the engine RPM detected by the engine RPM sensor 10 at the time the vehicle is started or gear positions are changed, the rotational speed of the input shaft of the transmission 12 detected by the input shaft speed sensor 12b, and the amount of depression of the accelerator pedal 14 detected by the accelerator pedal position sensor 15. The basic amount of engagement of clutch 2 is defined, for example, as an amount by which the clutch is connected from a position in which the clutch has started being connected. A speed of engagement of the clutch 2 is determined in a step 2 based on the engine RPM, the rotational speed of the input shaft of the transmission 12, and the amount of depression of the accelerator pedal 14. The speed of engagement of the clutch 2 is defined as an amount of movement of the clutch 2 within a preset time.

A step 3 ascertains whether conditions for setting an amount of adjustment are met or not. The amount of adjustment is not frequently set in each cycle, but set only under prescribed conditions. If the setting conditions are met, then control goes to a step 4, and if not then control goes to a step 6.

In the step 4, a setting signal from the setting means 18 is read. Control then goes from the step 4 to a step 5 in which an amount of adjustment corresponding to the setting signal or position read in the step 4 is stored in the memory (RAM) based on the relationship stored in the memory (ROM) between the setting positions and the amounts of adjustment.

The step 6 ascertains whether an amount of adjustment has already been set or not. If not set, then control goes to a step 7, and if set, then control proceeds to a step 8.

In the step 7, 0 (adjustment ±0) is set as an initial amount of adjustment.

The step 8 checks if the basic amount of clutch engagement which has been determined in the step 1 is 0 or not. If the basic amount of clutch engagement is 0, then control goes to a step 9, and if not 0, then control goes to a step 10.

In the step 9, the basic amount of clutch engagement (=0) is set as an amount of engagement of the clutch 2. That is, since the clutch is not engaged when the basic amount of clutch engagement is 0, the amount of engagement of the clutch 2 is not corrected by adjustments in order to prevent the clutch 2 from dragging.

In the step 10, the amount (which may be positive or negative) of adjustment determined in the step 5 is added to the basic amount of clutch engagement, and the sum is used as an amount of engagement of the clutch 2.

In a next step 11, the clutch actuator 3 is controlled on the basis of the amount of engagement of the clutch 2 which has been determined in the step 9 or 10 and also on the basis of the speed of engagement of the clutch 2 that has been determined in the step 2.

The process from the steps 1 through 11 is executed in a preset cycle or time period.

Adjustment of the speed at which the clutch 2 is operated will be described below. As with the aforesaid adjustment of the amount of engagement of the clutch 2, a basic speed of operation of the clutch 2 is first determined on the basis of the engine RPM, the rotational speed of the input shaft of the transmission 12, and the amount of depression of the accelerator pedal 14. Then, the basic amount of operation of the clutch 2 is corrected by a setting signal representative of an amount of speed adjustment set by setting means 19 for setting an amount of fine adjustment of the speed clutch operation, which is provided independently of the setting means 18. Setting means 19, similar to setting means 18, includes a fine-adjustment position detector 19a and a knob 19b. Thus, the speed at which the clutch actuator 3 is to be operated is determined. Based on the determined speed, the electronic control unit 9 applies a control signal to the clutch actuator 3 for controlling the clutch 2 to operate at a speed dependent on time-dependent changes of the clutch or the driver's taste.

The automatic clutch control apparatus according to the present invention thus can operate the clutch in a manner to start the vehicle smoothly or shift gear positions smoothly by setting an amount of adjustment even when the clutch suffers a time-dependent change or a temporary trouble, based only on basic clutch control data and adjustment setting data from the setting means. According to the present invention, therefore, it is not necessary to store clutch control data in a plurality of memories and select optimum clutch control data from these memories, but rather it is only necessary to store basic clutch control data in a memory. Consequently, the memory capacity of the electronic control unit is not increased.

The various tastes of drivers, ranging from better riding comfort achieved by relatively slow engagement of the clutch to a quick start or gear shift made possible by relatively quick clutch engagement, can be met simply by setting an amount of fine adjustment with the setting means.

Small irregularities of clutch mechanisms on newly manufactured vehicles can also be eliminated simply by setting an amount of fine adjustment with the setting means.

Although certain preferred embodiments have been shown and described, it should be understood that many changes and modifications may be made therein without departing from the scope of the appended claims.

What we claim is:

1. An automatic clutch control apparatus for controlling a clutch actuator for engaging and disengaging a clutch on a vehicle, comprising:

means for automatically determining a basic amount of engagement of the clutch from a position to start engaging the clutch based on operating conditions of the vehicle;

means for manually setting an amount of fine adjustment of the automatically determined amount of engagement of the clutch; and control means for controlling an amount of engagement of the clutch based on the automatically determined basic amount of engagement and the manually set amount of fine adjustment.

2. An automatic clutch control apparatus according to claim 1, wherein said setting means comprises a potentiometer.

3. An automatic clutch control apparatus according to claim 1, wherein said setting means comprises a multiple-contact selector switch.

4. An automatic clutch control apparatus for controlling a clutch actuator for engaging and disengaging a clutch on a vehicle, comprising:

means for automatically determining a basic speed of operation of the clutch actuator from a position to start engaging the clutch based on operating conditions of the vehicle;

means for manually setting an amount of fine adjustment of the speed of operation of the clutch actuator; and control means for controlling an amount of operation of the clutch based on the automatically determined basic speed of operation and the manually set amount of fine adjustment.

5. An automatic clutch control apparatus according to claim 4, wherein said setting means comprises a potentiometer.

6. An automatic clutch control apparatus according to claim 4, wherein said setting means comprises a multiple-contact selector switch.

7. An automatic clutch control apparatus for controlling a clutch actuator for engaging and disengaging a clutch on a vehicle, comprising:

an electronic control unit including means for automatically determining and outputting a control signal indicative of a basic amount of engagement of the clutch based on operating conditions of the vehicle;

means for manually setting an amount of fine adjustment of the amount of engagement of the clutch and outputting a setting signal indicative of the set amount of fine adjustment; and means, for comparing the control signal indicative of the basic amount of engagement and the setting signal indicative of the amount of fine adjustment, and means, for determining an adjustment of the basic amount of engagement corresponding to a difference between the setting signal and the control signal.

* * * * *

UNITED STATES PATENT AND TRADEMARK OFFICE
CERTIFICATE OF CORRECTION

PATENT NO. : 4,926,994

DATED : May 22, 1990

INVENTOR(S) : Toshifumi Koshizawa et al.

It is certified that error appears in the above-identified patent and that said Letters Patent is hereby corrected as shown below:

Col. 1, line 57, after "by" insert --the applicant of--.

Signed and Sealed this

Seventeenth Day of March, 1992

Attest:

HARRY F. MANBECK, JR.

*Attesting Officer*      *Commissioner of Patents and Trademarks*